US008239909B2

(12) United States Patent
Miura et al.

(10) Patent No.: US 8,239,909 B2
(45) Date of Patent: Aug. 7, 2012

(54) METHOD OF SECURING RESOURCES IN A VIDEO AND AUDIO STREAMING DELIVERY SYSTEM

(75) Inventors: Shuhei Miura, Tokyo (JP); Katsuhiro Ochiai, Tokyo (JP); Akira Kobayashi, Tokyo (JP); Motonobu Kimura, Tokyo (JP); Kaname Naito, Tokyo (JP); Junichi Sato, Tokyo (JP)

(73) Assignee: NEC Corporation, Tokyo (JP)

( * ) Notice: Subject to any disclaimer, the term of this patent is extended or adjusted under 35 U.S.C. 154(b) by 391 days.

(21) Appl. No.: 12/524,079

(22) PCT Filed: Jan. 21, 2008

(86) PCT No.: PCT/JP2008/050705
§ 371 (c)(1),
(2), (4) Date: Jul. 22, 2009

(87) PCT Pub. No.: WO2008/090843
PCT Pub. Date: Jul. 31, 2008

(65) Prior Publication Data
US 2010/0017837 A1 Jan. 21, 2010

(30) Foreign Application Priority Data
Jan. 24, 2007 (JP) ................................. 2007-013741

(51) Int. Cl.
*H04N 7/173* (2011.01)
(52) U.S. Cl. ....................................................... 725/116
(58) Field of Classification Search .................. None
See application file for complete search history.

(56) References Cited

U.S. PATENT DOCUMENTS

| 5,933,192 | A | * | 8/1999 | Crosby et al. ............ 375/240.25 |
| 6,771,661 | B1 | * | 8/2004 | Chawla et al. ................. 370/468 |
| 6,993,606 | B1 | * | 1/2006 | Takaku et al. ................... 710/61 |
| 7,142,255 | B2 | * | 11/2006 | Nohrden ........................ 348/725 |
| 7,370,342 | B2 | * | 5/2008 | Ismail et al. ..................... 725/46 |
| 7,720,983 | B2 | * | 5/2010 | Klemets et al. ................ 709/231 |
| 2002/0112244 | A1 | * | 8/2002 | Liou et al. ........................ 725/93 |
| 2002/0126988 | A1 | * | 9/2002 | Togashi et al. .................. 386/68 |

(Continued)

FOREIGN PATENT DOCUMENTS

JP 2002515217 A 5/2002

(Continued)

OTHER PUBLICATIONS

International Search Report for PCT/JP2008/050705 mailed May 1, 2008.

*Primary Examiner* — Brian Pendleton
*Assistant Examiner* — Jonathan V Lewis (57) ABSTRACT

A video and audio stream is predicted that is to be selected for reception next to a video and audio stream that is being received by the terminal or that is after a video and audio stream that has been selected for reception by the terminal. Resources necessary for delivering the predicted video and audio stream, in addition to resources necessary for the video and audio stream that is being received by the terminal or that has been selected for reception by the terminal, are secured in advance before a user of the terminal selects the next video and audio stream. The predicted video and audio stream is not delivered to the terminal before it coincides with a video and audio stream that is selected at the next zapping.

9 Claims, 4 Drawing Sheets

U.S. PATENT DOCUMENTS

| | | | |
|---|---|---|---|
| 2003/0236907 A1* | 12/2003 | Stewart et al. | 709/231 |
| 2004/0111741 A1* | 6/2004 | DePietro | 725/34 |
| 2004/0128694 A1* | 7/2004 | Bantz et al. | 725/95 |
| 2005/0149975 A1* | 7/2005 | Jutzi | 725/95 |
| 2006/0056510 A1* | 3/2006 | Van Der Schaar et al. | 375/240.12 |
| 2006/0104370 A1* | 5/2006 | Yamanaka et al. | 375/242 |
| 2006/0106770 A1* | 5/2006 | Vries | 707/3 |

FOREIGN PATENT DOCUMENTS

| | | |
|---|---|---|
| JP | 2003143587 A | 5/2003 |
| JP | 2005124193 A | 5/2005 |
| JP | 2005354283 A | 12/2005 |
| JP | 2006186737 A | 7/2006 |
| JP | 2007243947 A | 9/2007 |
| WO | 2005112465 A | 11/2005 |
| WO | 2006019481 A | 2/2006 |

* cited by examiner

Fig.5

METHOD OF SECURING RESOURCES IN A VIDEO AND AUDIO STREAMING DELIVERY SYSTEM

This application is the National Phase of PCT/JP2008/050705, filed Jan. 21, 2008, which is based upon and claims priority to Japanese Patent Application No. 2007-013741, filed on Jan. 24, 2007, the contents of which are incorporated herein by reference in its entirety.

TECHNICAL FIELD

The present invention relates to a video and audio streaming delivery system, and more particularly to a method of securing resources necessary for the delivery of video and audio streams.

BACKGROUND OF THE INVENTION

In a system for providing a video and audio streaming through unicast, in order to implement broadcast-type services where each stream is treated as a TV channel, allocation of bands in a path on which each stream is transmitted and settings for filtering (access control) have been typically performed each time zapping is carried out. As used herein, the term "zapping" refers to channel selection through the user's operation of a remote controller.

For example, for an IPTV service that is implemented through multicast, a band for a core network has enough capacity to deliver all channels at one time. However, a band between each terminal and a station that accommodates terminals is less than or equal to 100 Mbps for current common services. Therefore, if a band that is occupied by one stream is 6 Mbps, then 16 streams at most can be delivered to a terminal through multicast. Many of ADSL (Asymmetric Digital Subscriber Line) systems that are currently in widespread use have an effective performance around 10 Mbps, which can make it difficult to deliver two streams simultaneously. Accordingly, in order to cope with such a band mismatch, it is practical to build a system in the station which transmits a stream alone that the terminal has selected for viewing to the terminal through unicast.

A related art has the disadvantage that when a video and audio stream that is currently being viewed is switched to another video and audio stream through zapping, it takes much time to switch the stream, failing to deliver a zapping performance such as in TV. In particular, a video and audio streaming for which QoS (Quality of Service) is assured, requires additional operations to release the band for the old video and audio stream and to secure the band for a new video and audio stream as compared with the best effort video and audio streaming. This can result in worsening the zapping performance.

Figure 1:
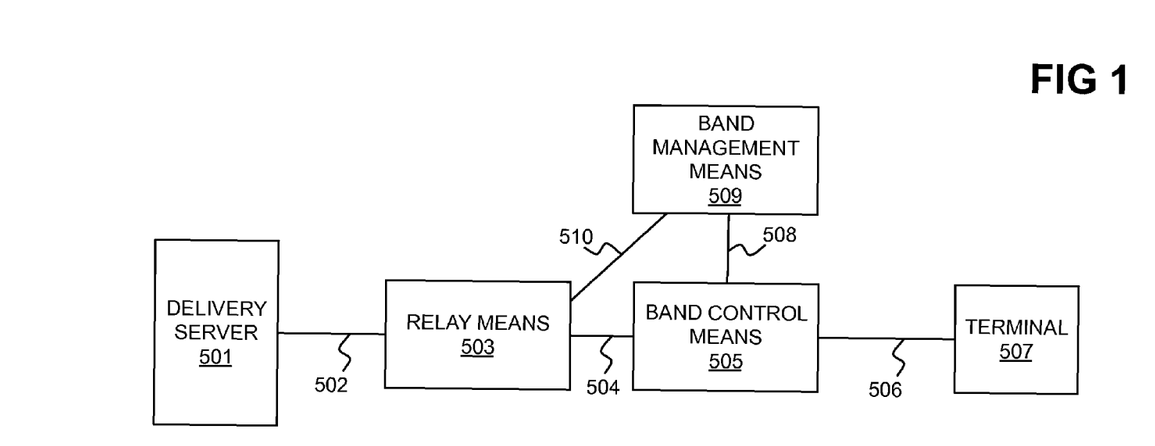
FIG. 1 is a block diagram of a video and audio delivery system according to prior art.

FIG. 1 of the accompanying drawings illustrates by way of example a video and audio stream delivery system of the related art.

Delivery server 501 delivers a plurality of video and audio streams to relay means 503 via delivery path 502 through multicast. Terminal 507 transmits a request to deliver a video and audio stream that terminal 507 desires to view and has selected from program information (not shown), to relay means 503 via delivery path 506, band control means 505 and delivery path 504. Relay means 503 transmits a request of a band that is necessary for the delivery in accordance with band information (not shown) of the stream that is requested, to band management means 509 via control line 510. If the requested band can be secured, band management means 509 instructs band control means 505 via control line 508 to secure the band and notifies relay means 503 via control line 510 that the band can be secured. Relay means 503 delivers a video and audio stream requested by terminal 507 to terminal 507 through unicast via delivery path 504, band control means 505 and delivery path 506.

Patent document 1 describes a system having such a configuration. In Patent document 1, in order to speed up the zapping, some of a plurality of video and audio streams that are delivered from a delivery server through multicast, are predicted as streams to be candidates for the next selection, and are delivered to a terminal in advance after they are filtered at the multicast points. Upon receipt of zapping instructions of zapping from a higher level application program and if the prediction comes true, the terminal selects, from among video and audio streams that have been received at the terminal, the relevant video and audio stream(s) and plays back the same.

However, according to the method described in Patent document 1, in addition to the video and audio streams that are currently being viewed by the user, the predicted video and audio streams as well actually flow between the multicast points and the terminal as video and audio streams. Accordingly, network resources are often depleted when network resources between the multicast point and the terminal are not sufficient due to the use of ADSL as described earlier, or when a plurality of terminals receive video and audio streams from the same multicast points. For example, in the case of a line having only a network throughput of 10 Mbps, only one stream of 6 Mbps is allowed to pass through the line. Therefore, speeding up zapping can not be achieved with this method.

Patent document 1: JP2003-143587A

DISCLOSURE OF THE INVENTION

Problems to be Solved by the Invention

It is an object of the present invention to provide a resource securing method, a relay device for video and audio streams, a video and audio streaming delivery system and a recording medium for storing a resource securing program which improves a stream switching speed and at the same time minimizes resources that are actually used, at the time of zapping in video and audio streaming for which QoS is assured.

Means to Solve the Problems

A video and audio stream is predicted that is to be selected for reception after a video and audio stream that is being received or that is selected for reception by a terminal. Resources necessary for delivering the predicted video and audio stream, in addition to resources necessary for the video and audio stream that is being received by the terminal or that has been selected for reception by the terminal, are secured in advance before a user of the terminal selects the next video and audio stream. The predicted video and audio stream is not delivered to the terminal before it coincides with a video and audio stream that is selected at the time of next zapping.

According to the present invention, since securing a band and access control necessary for viewing the next stream are completed before a zapping operation is performed by the user, the time necessary for securing a band for viewing a new stream can be shortened. Further, according to the present invention, since the determination whether or not securing a band for viewing the next new stream is possible has been completed before the user performs a zapping operation, it is possible to promptly notify the user whether or not zapping is possible, at the time of the zapping operation.

EXPLANATION OF SYMBOLS 101 delivery server
102 delivery path
103 relay device
104 delivery path
105 band control device
106 delivery path
107 terminal
108 control line
109 band management device
110 control line
111 zapping prediction device
112 control line
201-213 step
301 IPTV delivery server
302 intranet
303 relay device
304 multicast termination unit
305 intranet
306 router
307 public telephone line
308 IPTV reception terminal
309 logical communication path
310 zapping prediction unit
311 intranet
312 resource reception control server
313 intranet
401 remote controller
402 power supply button
403 channel back-feed button
404 channel forward-feed button
405 volume down button
406 volume up button
407 channel designation buttons

BEST MODE FOR CARRYING OUT THE INVENTION

A best mode for carrying out the invention will now be described in detail with reference to the drawings.

Figure 2:
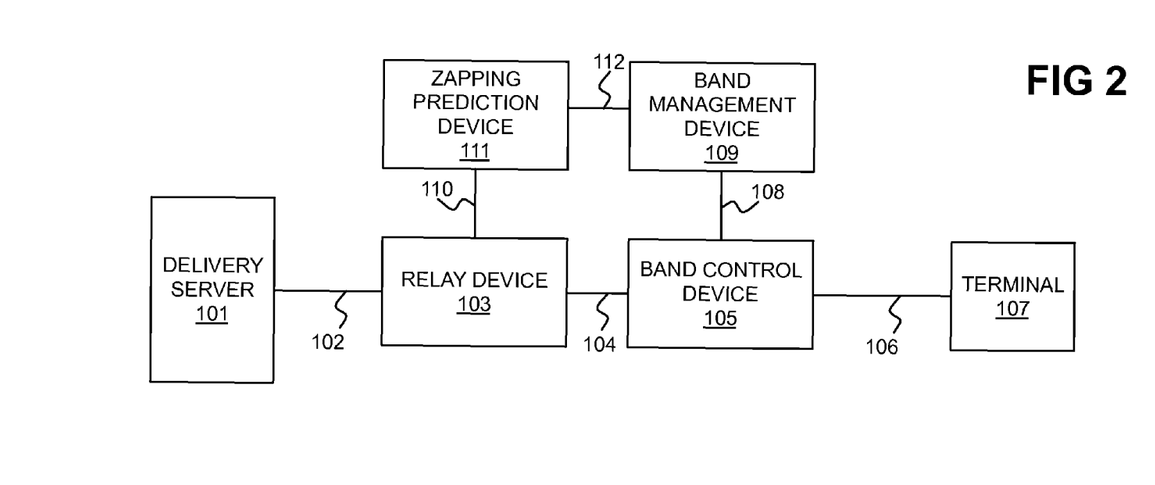
FIG. 2 is a block diagram of a video and audio delivery system according to an exemplary embodiment of the present invention.

FIG. 2 is a block diagram according to an exemplary embodiment of the present invention.

Delivery server 101 is connected with relay device 103 via delivery path 102. Relay device 103 is connected with band control device 105 via delivery path 104. Band control device 105 is connected with terminal 107 via delivery path 106. Zapping prediction device 111 is connected with relay device 103 via control line 110 and is connected with band management device 109 via control line 112. Band management device 109 is connected with band control device 105 via control line 108.

Figure 3:
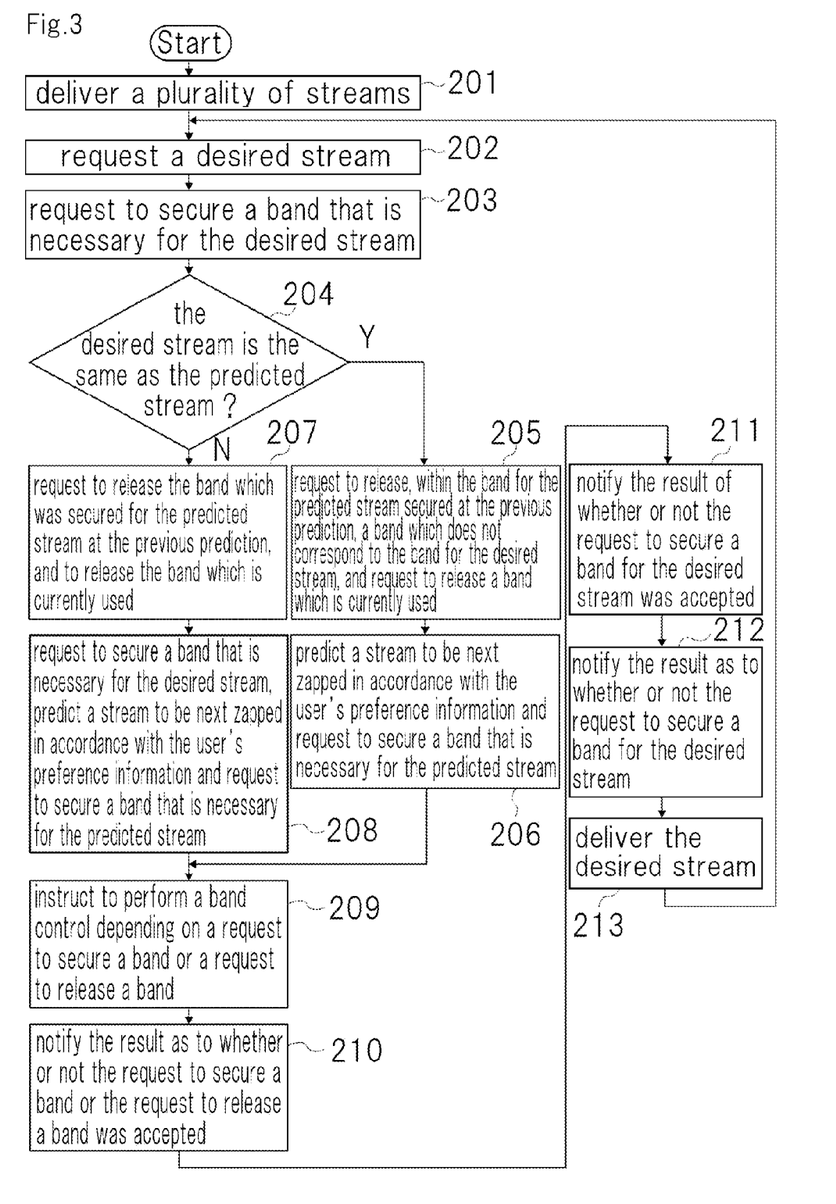
FIG. 3 is a diagram illustrating the operation of the video and audio delivery system shown in FIG. 2.

FIG. 3 is a flow chart illustrating the operation of the video and audio streaming delivery system of the present exemplary embodiment.

Delivery server 101 delivers a plurality of streams to relay device 103 through multicast (step 201). In place of multicast, this delivery may be performed through unicast. Relay device 103 may simultaneously receive streams from other delivery servers (not shown) as well.

When a user selects a stream using a remote controller etc., then terminal 107 transmits to relay device 103 a request to transmit the selected stream as a stream that the user desires to view (step 202). When the request is transmitted, information to identify the stream is added to the request. As the information to identify the stream, a channel number to identify the stream as a channel, a URL (Uniform Resource Locator) or an IP address may be used.

Relay device 103 transmits to zapping prediction device 111 a request to request the device to secure a band that is necessary for the stream that the user desires to view and that is to be received from terminal 107 (step 203). The necessary band may be an average of bands for streams that are selected from streams received at relay device 103 and that correspond to the stream that the user desires to view. Alternatively, the necessary band may be determined by referencing the stream information when stream information is provided separately in advance.

Zapping prediction device 111 determines whether or not the stream that is received and that the user desires to view is identical to the predicted stream that was recorded when the previous request to secure a band was accepted (step 204).

If a match is found in the determination of step 204, zapping prediction device 111 transmits to band management device 109: a request to release a band, from among the band that were secured at the previous prediction, which do not correspond to the band for the stream that the user desires to view; and a request to release a band which is currently used for the reception of streams by terminal 107 (step 205). Then, zapping prediction device 111 predicts a stream to be next zapped in accordance with the user's preference information and transmits a request to secure a band that is necessary for the predicted stream (step 206). The prediction of a stream to be next zapped in accordance with the user's preference information is performed as follows. Zapping prediction device 111 maintains the viewing history, gender and age group of a user, and keywords, as preference information. Keywords involves a title, a genre, names of performers, the name of a screenwriter, the name of a director of a program, words in the program information, and purchase history for a mail-order sale using the Internet. The keywords may be registered in zapping prediction device 111 in advance by users or may be automatically accumulated in zapping prediction device 111. Preference information may be weighted. Zapping prediction device 111 calculates the degree of coincidence between each of the streams received by relay device 103 and the user's preference based on the user's preference information, and selects streams having high degrees of coincidence as candidates for streams to be zapped. The number of candidates for streams to be zapped may be determined based on the specifications of delivery paths 104, 106 and band control device 105 that are present between relay device 103 and terminal 107. For example, the number of candidates for streams to be zapped may be one when the delivery paths are designed to have an insufficient band margin, and the number of candidates for streams to be zapped may be two or three when the delivery paths are designed to have a sufficient band margin.

If a mismatch is found in the determination of step 204, zapping prediction device 111 transmits to band management device 109: a request to release the band which was secured for the predicted stream at the previous prediction; and a request to release the band which is currently used for the reception of streams by terminal 107 (step 205). Then, zapping prediction device 111 transmits to band management device 109 a request to secure a band that is necessary for the stream that the user desires to view, predicts a stream to be next zapped in accordance with the user's preference information and transmits to band management device 109 a request to secure a band that is necessary for the predicted stream (step 208).

The procedures for the request to release a band and the request to secure a band that are performed in steps 205 to 208 are given by way of example, and each request may be performed in sequential order. The timing at which each request is transmitted may be shifted. If a match is found in the determination of step 204, for example, after notifying relay device 103 of the result as to whether or not the request to secure a band was accepted in step 211, a request to release bands for the streams that are not predicted and a request to secure bands for the streams that are predicted may be transmitted. The request to release the band for the stream that is currently received by terminal 107 may be transmitted after performing steps 211, 213, or step 213 or after the success of reception of a new stream by terminal 107, not shown. The same holds true for the case in which the result of determination in step 204 is "N (=No)".

Band management device 109 instructs band control device 105 to perform a band control depending on a request to secure a band or a request to release a band (step 209). At this time, when band management device 109 failed in requesting to secure a band or to release a band, band management device 109 may provide no instructions to band control device 105. In this case, at steps 210, 211, 212 and 213, band management device 109 may behave as if it did not receive requests from terminal 107, regarding the stream that the user desires to view and the new and old predicted streams, so that the current reception at terminal 107 may not discontinue. Even in this case, the failure of requests may be notified to terminal 107 at steps 210, 211 and 212.

Band management device 109 notifies zapping prediction device 111 of the result as to whether or not the request to secure a band or the request to release a band was accepted (step 210).

Zapping prediction device 111 notifies relay device 103 of the result of whether or not the request to secure a band for the stream that the user desires to view was accepted (step 211).

Relay device 103 notifies terminal 107 of the result as to whether or not the request to secure a band for the stream that the user desires to view was accepted (step 212). Upon notification that the request to secure a band was accepted, relay device 103 delivers the requested stream that the user desires to view, to terminal 107 through unicast (step 213). The requested stream may be delivered to terminal 107 through multicast in place of unicast. The delivery through multicast at this time is effective when other terminals (not shown) are connected with relay device 103 together with terminal 107. That is, when a plurality of terminals simultaneously view the same video and audio stream in a case where delivery paths 104, 106 and band control device 105 do not have bands and performance that are sufficient for delivering streams to a plurality of terminals through unicast, then the same video and audio stream may be delivered through multicast.

Further, when band control device 105 does not have sufficient unused resources at the time of securing a band by band management device 109, a band for the predicted video and audio stream may be secured as a band for a virtual resource. In this case, at the time when band control device 105 has decided that the predicted video and audio stream is a video and audio stream that is to be actually viewed next, band control device 105, band management device 109 and zapping prediction device 111 may perform processing to switch connections for delivering the predicted video and audio stream as the actual stream. For example, when it is decided that the predicted video and audio stream is an actual video and audio stream that is to be viewed next, zapping prediction device 111 may notify band management device 109 of the decision, which in turn instructs band control device 105 to switch the connections.

Processing for securing a band and for releasing a band may be accompanied by filtering processing (access control) for the connected terminal throughout all the above-described procedures. For example, when a firewall function is installed on band control device 105, packet filtering may be set up so that when a band for a relevant stream is secured, communication between a delivery server that delivers the stream and a terminal that receives the stream is made possible. Similarly, when releasing a band, packet filtering may be set up so that communication between a delivery server that delivers the stream and a terminal that receives the stream is made impossible. Further, filtering processing may be performed before securing a band and releasing a band, simultaneously with securing a band and releasing a band, or after securing a band and releasing a band.

Figure 4:
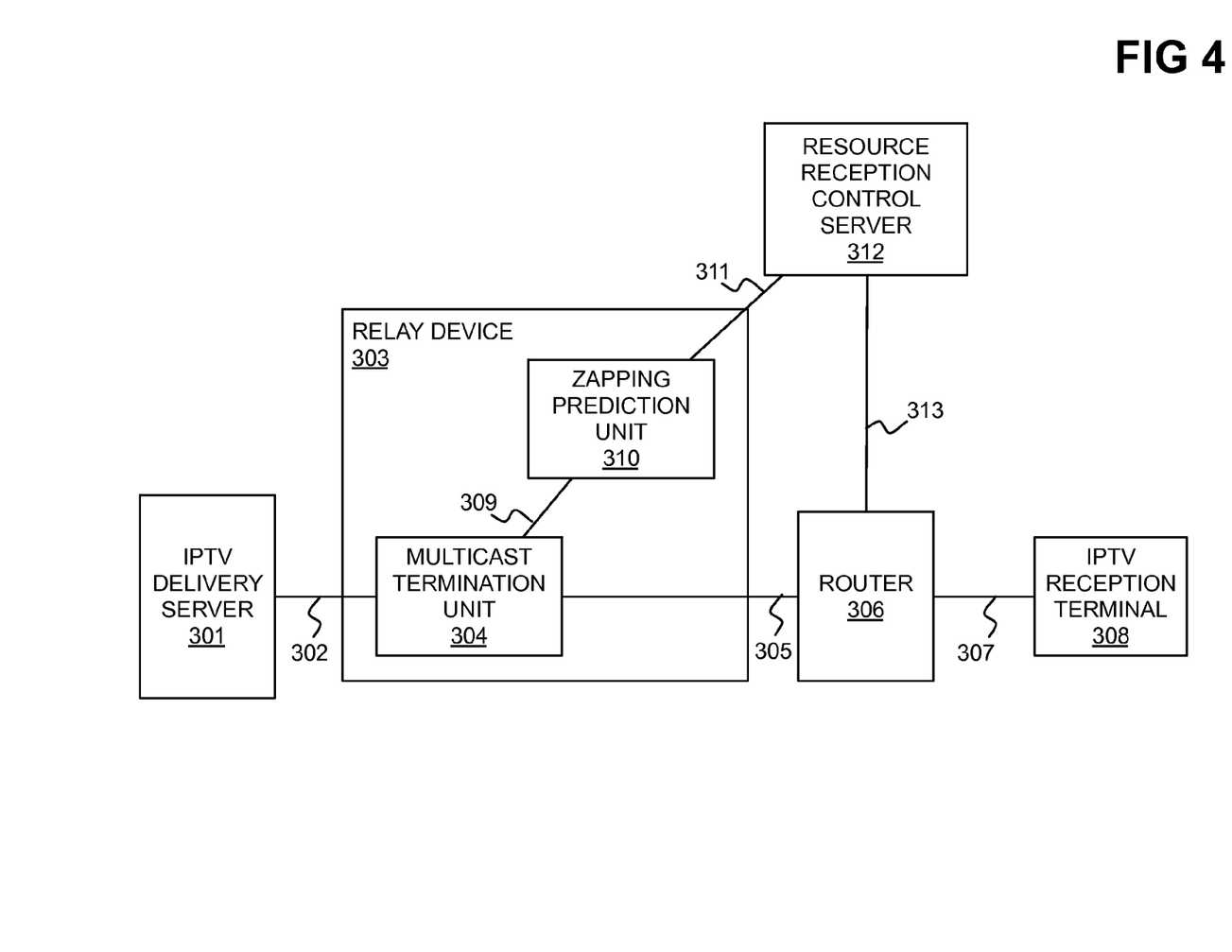
FIG. 4 is a block diagram of a concrete example of a video and audio delivery system shown in FIG. 2

FIG. 4 is a block diagram of a concrete example of a video and audio delivery system shown in FIG. 2.

Relay device 303 comprises multicast terminating device 304 for terminating a multicast to convert the same into a unicast, and zapping prediction unit 310 for predicting a stream that is to be selected next. Multicast terminating device 304 and zapping prediction unit 310 implement programs and communicate with each other through logical communication path 309 that connects between the programs. IPTV delivery server 301 connects with multicast terminating device 304 (in delay device 303) via intranet 302. Multicast terminating device 304 connects with router 306 via intranet 305. Router 306 is a router having a packet preferential control function and an access control function. The packet preferential control function is to control a band for a particular packet, and the access control function is able to specify a source or a destination to which a packet can be transmitted. Router 306 connects with IPTV reception terminal 308 via a public telephone link (ADSL). Resource reception control server 312 controls the packet preferential control function and the access control function of router 306 via intranet 313. Resource reception control server 312 receives a router control request from zapping prediction unit 310 (in relay device 303) via intranet 311.

Figure 5:
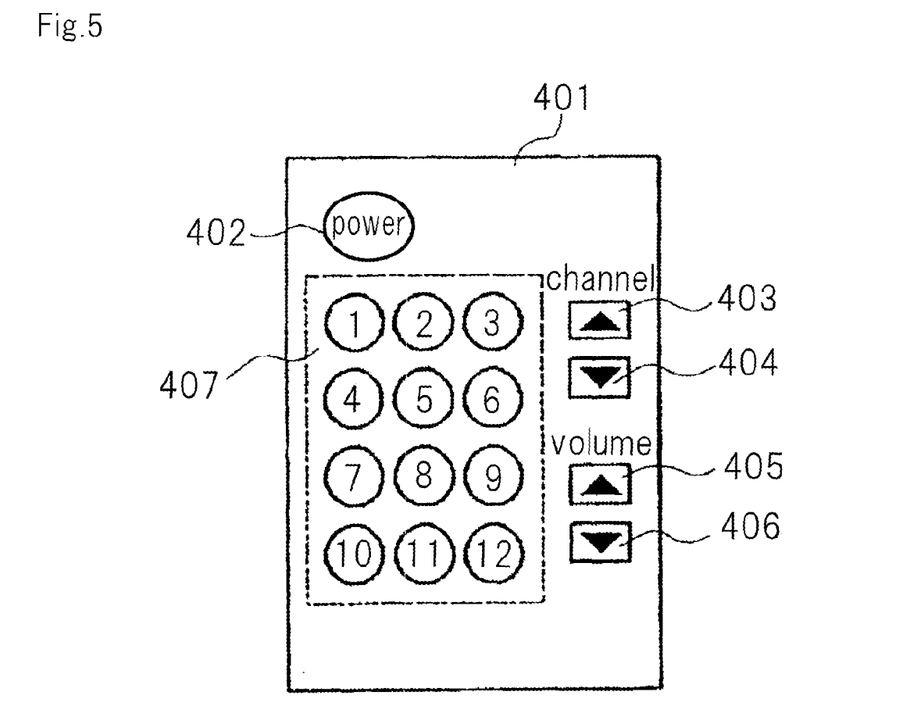
FIG. 5 is a diagram illustrating a user interface of a remote controller with which a user operates an IPTV reception terminal.

FIG. 5 is a diagram illustrating by way of example a remote controller for controlling IPTV reception terminal 308.

Remote controller 401 comprises power supply button 402, channel back-feed button 403, channel forward-feed button 404, volume down button 405, volume up button 406 and channel designation button group 407.

Each button of channel designation button group 407 is assigned video and audio streams A to L in this order that are delivered from IPTV delivery server 301. Specifically, channel 1 is assigned video and audio stream A, channel 2 is assigned video and audio stream B, channel 3 is assigned video and audio stream C, channel 4 is assigned video and audio stream D, channel 5 is assigned video and audio stream E, channel 6 is assigned video and audio stream F, channel 7 is assigned video and audio stream G, channel 8 is assigned video and audio stream H, channel 9 is assigned video and audio stream I, channel 10 is assigned video and audio stream J, channel 11 is assigned video and audio stream K, and channel 12 is assigned video and audio stream L.

When channel back-feed button 403 is operated, remote controller 401 transmits a request to playback a video and audio stream which is adjacent to the video and audio stream currently being viewed and whose channel number is smaller than the latter, as an operation corresponding to an operation to select a TV channel. That is, when channel back-feed button 403 is pushed while video and audio stream C is currently being viewed, video and audio stream B is viewed. This is the same operation when button "2" in channel designation button group 407 is operated.

When channel feed-feed button 404 is operated, remote controller 401 transmits a request to playback a video and audio stream which is adjacent to the video and audio stream currently being viewed and whose channel number is greater than the latter, as an operation corresponding to an operation to select a TV channel. That is, when channel feed-feed button 404 is pushed while video and audio stream C is currently being viewed, video and audio stream D is viewed. This is the same operation when button "4" in channel designation button group 407 is operated.

Next, operation of the specific example will be explained.

IPTV delivery server 301 is now delivering 12 video and audio streams A to L (not shown) through multicast to multicast terminating device 304. In this example, assume that as a result of calculation of the degree of coincidence between each of streams A to L and the user's preference based on the user's preference information in zapping prediction unit 310, five streams having a higher degree of coincidence, from highest to lowest, are A, B, C, D and E and that the number of candidates for streams to be zapped is two. Further, assume that a video and audio stream that is currently received by IPTV reception terminal 308 is video and audio stream D, and that when remote controller 401 was previously operated, video and audio streams A and B were predicted and that bands for video and audio streams A and B have been secured.

When the user operates remote controller 401 to push button "1" in channel designation button group 407, then IPTV reception terminal 308 transmits a request to view video and audio stream A to multicast terminating device 304. Multicast terminating device 304 then transmits the request to zapping prediction unit 310

At the reception of the previous view request, zapping prediction unit 310 determined video and audio stream A as a predicted video and audio stream, and completed securing a band and access control which are necessary for delivering video and audio stream A via router 206. Upon receipt of the view request, zapping prediction unit 310 calculates again the degree of coincidence between each of the streams and the user's preference, and determines video and audio streams B and C having a higher degree of coincidence other than video and audio stream A, as the next predicted video and audio streams. Then, zapping prediction unit 310 transmits to resource reception control server 312: a request to secure bands for the delivery of video and audio streams A, B and C; a request to arrange that accesses to video and audio streams A, B and C are permitted (accesses to video and audio streams A, B are continued and an access to video and audio stream C is new); a request to release the band for video and audio stream D which has become unnecessary; and a request to arrange that an access to video and audio stream D is not permitted.

In accordance with the requests from zapping prediction unit 310, resource reception control server 312 transmits to router 306: a request to release the band for video and audio stream D; a request to arrange that an access to video and audio stream D is not permitted; a request to secure bands for video and audio streams A, B and C (accesses to video and audio streams A, B are continued and an access to video and audio stream C is new); and a request to arrange that accesses to video and audio streams A, B and C are permitted. Here, it is assumed that in response to the requests, router 306 has sent a reply to accept the requests to resource reception control server 312. In response, resource reception control server 312 transmits to zapping prediction unit 310 a notice that the requests have been accepted.

Having received from resource reception control server 312 a notice that the requests have been accepted, zapping prediction unit 310 determines video and audio stream A that is now being viewed and that is requested to resource reception control server 312, and video and audio streams B and C having a higher degree of coincidence with the user's preference other than video and audio stream A, as predicted video and audio streams, and transmits to multi-cast terminating device 304 a notice that the requests have been accepted.

Upon receipt of the notice from zapping prediction unit 310 that requests have been accepted, multicast terminating device 304 stops the delivery of video and audio stream D that is currently transmitted to IPTV reception terminal 308 via router 306 through unicast, and instead commences the transmission of video and audio stream A.

IPTV reception terminal 308 commences the reception of the new video and audio stream A and plays back the same.

Zapping prediction unit 310 in the concrete example may be incorporated in resource reception control server 312 in place of relay device 303. In this case, when the view request from IPTV reception terminal 308 is received at multicast terminating device 304, multi-cast terminating device 304 transmits a view request to zapping prediction unit 310 in resource reception control server 312. Similar to the above specific example, zapping prediction unit 310 transmits a request to secure a band and a request to set an access in the specific example to a control unit of bands and accesses (not shown) in resource reception control server 312.

Although the above specific example regards a case where the number of IPTV reception terminals is one, a plurality of IPTV reception terminals may be simultaneously connected to relay device 303. In this case, IPTV reception terminals operate similarly to IPTV reception terminal 308. Further, router 306 may concurrently control view requests/responses and video and audio streams for the plurality of IPTV reception terminals.

A plurality of video and audio streams that are transmitted from IPTV delivery server 301 through multicast may be simultaneously received by a plurality of relay devices, and each relay device may be connected with one or more IPTV reception terminals. In this case, each relay device operates similarly to relay device 303 and each IPTV reception terminal operates similarly to IPTV reception terminal 308.

Furthermore, when a view request/a response and delivery of a video and audio stream between relay device 303 and IPTV reception terminal 308 is regarded as one session, router 306 may have the capability to concurrently control sessions that are generated at relay devices and at IPTV reception terminals Moreover, when a plurality of routers 306 are provided and each router 306 controls one or more sessions, the plurality of routers may be controlled by one resource reception control server 312 or by a plurality of resource reception control servers 312. In this case, it is assumed that zapping prediction unit 310 in the above specific example realizes the way to specify resource reception control servers 312 that manages router 306 that controls the sessions of zapping prediction unit 310. The way to specify resource reception control servers 312 may include a way to fixedly hold the addresses of resource reception control servers 312 in a file that is set when resource reception control servers 312 are activated. When zapping prediction unit 310 is within resource reception control servers 312, it is assumed that multicast terminating device 304 realizes the way to specify the zapping prediction unit in resource reception control servers 312 that manages router 306 that controls the sessions of multicast terminating device 304. The way to specify the zapping prediction unit may also include a way to fixedly hold the addresses of the zapping prediction units in a file that is set when the zapping prediction units are activated.

A video and audio stream that is delivered from IPTV delivery server 301 to multicast terminating device 304 may be delivered through unicast in place of multicast.

Relay device 303 may simultaneously receive video and audio streams from a plurality of IPTV reception terminals, and from among the video and audio streams, may transmit to IPTV reception terminal 308 a video and audio stream that is requested to view from IPTV reception terminal 308.

The request to secure a band, the request to release a band and the request to set access control to resource reception control servers 312 may be transmitted by multicast terminating device 304 in place of zapping prediction unit 310. In this case, when zapping prediction unit 310 sets a predicted video and audio stream, zapping prediction unit 310 sends information on the predicted video and audio stream to multicast terminating device 304. Multicast terminating device 304 transmits a request to secure a band, a request to release a band and a request to set access control which are necessary for the predicted video and audio stream, utilizing the information, and receives a reply from resource reception control servers 312.

The functions of zapping prediction unit 310 and resource reception control servers 312 may be carried out by recording a program for performing the functions of the processing operation in a computer-readable recording medium, and by reading the program thus recorded into a computer. The computer-readable recording medium may refer to a recording medium such as a flexible disk, a CD-ROM, or the like, or a recording medium such as a hard disk drive incorporated in a computer system. The computer-readable recording medium may also refer to a medium for dynamically holding a computer program for a short period of time, e.g., a transmission medium or a transmission wave, for use in applications for transmitting the program through the Internet, or a medium for holding the program for a certain period of time, e.g., a volatile memory in a computer system which operates as a server in such applications.

According to the present invention, when virtual channels are provided in streaming, securing bands for streams that may be zapped and viewed next and an access control alone are performed based on prediction prior to the zapping operation, thus improving a speed to switch streams at the time of zapping and minimizing network resources that are actually used.

While preferred exemplary embodiments of the present invention have been described using specific terms, such description is for illustrative purposes only, and it is to be understood that changes and variations may be made without departing from the spirit or scope of the following claims.

What is claimed is:

1. A method of securing resources for a video and audio stream in a system wherein a delivery server delivers video and audio streams to terminals, said method comprising:

predicting a video and audio stream that is to be selected for reception after a video and audio stream that is being received by a terminal or after a video and audio stream that has been selected for reception by said terminal;

securing resources necessary for delivering the predicted video and audio stream, in addition to securing resources necessary for the video and audio stream that is being received by said terminal or that has been selected for reception by said terminal, in advance before a user of said terminal selects the next video and audio stream; and delivering the predicted video and audio stream to said terminal when it coincides with a video and audio stream that is selected at a next zapping, wherein said predicting a video and audio stream and said securing said resources in advance before a user of the terminal selects the next video and audio stream include:

receiving a request to secure a band necessary for a video and audio stream that the user of said terminal has desired to view;

accepting the request and responsively recording a given video and audio stream;

determining whether or not the video and audio stream that the user of said terminal has desired to view coincides with the given video and audio stream that was recorded when the request was accepted;

when the result of said determination shows consistency in that the video and audio stream that the user of said terminal has desired to view does coincide with the given video and audio stream that was recorded when the request was accepted, transmitting a request to release, within the band for the predicted stream that was secured at the previous prediction, a band for a stream that the user did not desire to view at this time, a request to release a band that is currently used by said terminal for reception of a video and audio stream, and a request to secure a band necessary for a video and audio stream that is predicted to be zapped next, that is, for a new predicted video and audio stream; and when the result of said determination shows inconsistency in that the video and audio stream that the user of said terminal has desired to view does not coincide with the given video and audio stream that was recorded when the request was accepted, transmitting a request to release the band for the predicted stream that was secured at the previous prediction, a request to release the band that is currently used by said terminal for reception of a video and audio stream, a request to secure a band necessary for the video and audio stream that the user has desired to view, and a request to secure a band necessary for a video and audio stream that is predicted to be zapped next, that is, for a new predicted video and audio stream.

2. The method of securing resources for a video and audio stream according to claim 1, wherein said predicting a video and audio stream includes predicting a video and audio stream that is predicted to be zapped next, based on the user's preference, as a video and audio stream to be selected next for reception.

3. The method of securing resources for a video and audio stream according to claim 1, wherein it further includes performing filtering of said terminal at the time of securing and releasing bands.

4. A relay device for video and audio streams comprising:
hardware including at least a processor;
a relay unit implemented at least by the hardware to relay communications between terminals and a delivery server for delivering video and audio streams to the terminals; and
a zapping predicting unit implemented at least by the hardware to predict a video and audio stream that is to be selected for reception after a video and audio stream that is being received by a terminal or after a video and audio stream that has been selected for reception,
wherein said relay unit transmits to said zapping prediction unit a request to secure a band necessary for the video and audio stream that the user of said terminal has desired to view, and wherein said zapping prediction unit
receives a request to secure a band necessary for the video and audio stream that the user of said terminal has desired to view;
accepts the request and responsively causes a given video and audio stream to be recorded;
determines whether or not the video and audio stream that the user of said terminal has desired to view coincides with the given video and audio stream that was recorded when the previous request was accepted;
when the result of said determination shows consistency in that the video and audio stream that the user of said terminal has desired to view does coincide with the given video and audio stream that was recorded when the request was accepted, transmits a request to release, within the band for the stream that was secured at the previous prediction, a band for a stream that the user did not desire to view at this time, a request to release a band that is currently used by said terminal for reception of a video and audio stream, and a request to secure a band necessary for a video and audio stream that is predicted to be zapped next, that is, for a new predicted video and audio stream; and
when the result of said determination shows inconsistency in that the video and audio stream that the user of said terminal has desired to view does not coincide with the given video and audio stream that was recorded when the request was accepted, transmits a request to release the band for the predicted stream that was secured at the previous prediction, a request to release the band that is currently used by said terminal for reception of a video and audio stream, a request to secure a band necessary for the video and audio stream that the user has desired to view, and a request to secure a band necessary for a video and audio stream that is predicted to be zapped next, that is, for a new predicted video and audio stream.

5. The relay device for video and audio streams according to claim 4, wherein the zapping prediction unit predicts a video and audio stream that is predicted to be zapped next, based on the user's preference, as a video and audio stream to be selected next for reception.

6. A system for delivering video and audio streams wherein a delivery server delivers video and audio streams to terminals, comprising:
hardware including at least a processor;
a predicting unit implemented at least by the hardware to predict a video and audio stream that is to be selected for reception after a video and audio stream that is being received by a terminal or after a video and audio stream that has been selected for reception by said terminal;
a securing unit implemented at least by the hardware to secure resources necessary for delivering the predicted video and audio stream, in addition to securing resources necessary for the video and audio stream that is being received by said terminal or that has been selected for reception by said terminal, in advance before a user of said terminal selects the next video and audio stream; and
a delivery unit implemented at least by the hardware to deliver the predicted video and audio stream to said terminal when it coincides with a video and audio stream that is selected at a next zapping,
wherein said resources include at lease a band necessary for a video and audio stream, and wherein said securing unit secures the resources in advance before a user of the terminal selects the next video and audio stream:
receives a request to secure a band necessary for a video and audio stream that the user of said terminal has desired to view;
accepts the request and responsively causes a given video and audio stream to be recorded;
determines whether or not the video and audio stream that the user of said terminal has desired to view coincides with the given video and audio stream that was recorded when the previous request was accepted;
when the result of said determination shows consistency in that the video and audio stream that the user of said terminal has desired to view does coincide with the given video and audio stream that was recorded when the request was accepted, transmits a request to release, within the band for the stream that was secured at the previous prediction, a band for a stream that the user did not desire to view at this time, a request to release a band that is currently used by said terminal for reception of a video and audio stream, and a request to secure a band necessary for a video and audio stream that is predicted to be zapped next, that is, for a new predicted video and audio stream; and
when the result of said determination shows inconsistency in that the video and audio stream that the user of said terminal has desired to view does not coincide with the given video and audio stream that was recorded when the request was accepted, transmits a request to release the band for the predicted stream that was secured at the previous prediction, a request to release the band that is currently used by said terminal for reception of a video and audio stream, a request to secure a band necessary for the video and audio stream that the user has desired to view, and a request to secure a band necessary for a video and audio stream that is predicted to be zapped next, that is, for a new predicted video and audio stream.

7. The system for delivering video and audio streams according to claim 6, wherein said predicting unit predicts a video and audio stream that is predicted to be zapped next, based on the user's preference, as a video and audio stream to be selected next for reception.

8. A non-transitory computer readable medium storing a program for causing a computer to perform in a system wherein a delivery server delivers video and audio streams to terminals:
predicting a video and audio stream that is to be selected for reception after a video and audio stream that is being received by a terminal or after a video and audio stream that has been selected for reception by said terminal;

securing resources necessary for delivering the predicted video and audio stream, in addition to securing resources necessary for the video and audio stream that is being received by said terminal or that has been selected for reception by said terminal, in advance before a user of the terminal selects the next video and audio stream; and delivering the predicted video and audio stream to said terminal when it coincides with a video and audio stream that is selected at a next zapping, wherein said predicting a video and audio stream and said securing said resources in advance before a user of the terminal selects the next video and audio stream include:

accepting the request and responsively recording a given video and audio stream;

determining whether or not the video and audio stream that the user of said terminal has desired to view coincides with the given video and audio stream that was recorded when the request was accepted;

when the result of said determination shows consistency in that the video and audio stream that the user of said terminal has desired to view does coincide with the given video and audio stream that was recorded when the request was accepted, transmitting a request to release, within the band for the predicted stream that was secured at the previous prediction, a band for a stream that the user did not desire to view at this time, a request to release a band that is currently used by said terminal for reception of a video and audio stream, and a request to secure a band necessary for a video and audio stream that is predicted to be zapped next, that is, for a new predicted video and audio stream; and when the result of said determination shows inconsistency in that the video and audio stream that the user of said terminal has desired to view does not coincide with the given video and audio stream that was recorded when the request was accepted, transmitting a request to release the band for the predicted stream that was secured at the previous prediction, a request to release the band that is currently used by said terminal for reception of a video and audio stream, a request to secure a band necessary for the video and audio stream that the user has desired to view, and a request to secure a band necessary for a video and audio stream that is predicted to be zapped next, that is, for a new predicted video and audio stream.

9. The non-transitory computer readable medium according to claim 8, wherein said predicting a video and audio stream predicts a video and audio stream that is predicted to be zapped next, based on the user's preference, as a video and audio stream to be selected next for reception.

* * * * *